United States Patent [19]

Almaula

[11] Patent Number: 4,597,947

[45] Date of Patent: Jul. 1, 1986

[54] MASS TRANSFER AND MATERIAL SEPARATION MICROCHANNEL PLATE APPARATUS

[75] Inventor: Bipin C. Almaula, Washington, D.C.

[73] Assignee: The United States of America as represented by the Secretary of the Army, Washington, D.C.

[21] Appl. No.: 703,978

[22] Filed: Feb. 21, 1985

Related U.S. Application Data

[62] Division of Ser. No. 509,840, Jun. 30, 1983, abandoned.

[51] Int. Cl.$^4$ .......................... B01D 3/22; B01J 10/00; B01J 35/02
[52] U.S. Cl. .................................. 422/191; 202/158; 203/DIG. 6; 210/243; 210/748; 210/927; 261/114 R; 261/122; 422/195; 422/211; 422/312; 502/527
[58] Field of Search .............. 159/DIG. 26, DIG. 27, 159/DIG. 28; 202/158; 261/114 R, 122, 104; 196/100; 203/DIG. 6; 422/191, 193, 197, 211, 222, 311, 312, 195; 210/243, 748, 927; 502/527

[56] References Cited

U.S. PATENT DOCUMENTS

| | | | |
|---|---|---|---|
| 2,912,377 | 11/1959 | Lehrian | 202/158 X |
| 3,503,712 | 3/1970 | Sussman | 261/104 X |
| 3,506,408 | 4/1970 | Kageyama et al. | 203/DIG. 6 X |
| 3,520,416 | 7/1970 | Keedwell | 261/104 X |
| 3,634,534 | 1/1972 | Haunschild | 203/DIG. 6 X |
| 3,692,648 | 9/1972 | Matloff et al. | 210/927 X |
| 3,958,964 | 5/1976 | Koch | 261/122 X |
| 4,118,285 | 10/1978 | Yeh | 261/114 R X |
| 4,322,629 | 3/1982 | Eloy et al. | 250/299 |
| 4,363,644 | 12/1982 | Sato et al. | 502/527 X |
| 4,391,675 | 7/1983 | Lynn et al. | 202/158 |
| 4,405,449 | 9/1983 | Trager | 202/158 X |
| 4,439,350 | 3/1984 | Jones | 203/DIG. 6 X |
| 4,475,005 | 10/1984 | Paret | 203/DIG. 6 X |

*Primary Examiner*—Barry S. Richman
*Assistant Examiner*—Brion P. Heaney
*Attorney, Agent, or Firm*—Max L. Harwell; Robert P. Gibson; Anthony T. Lane

[57] ABSTRACT

An apparatus comprised of a mass transfer microchannel plate (MCP) structure distillation column in a columnar configuration within an air tight cylindrical housing. The apparatus may be used in separation of organic chemicals like petrochemicals, vegetable oils, inorganic chemicals like steam stripping of bromine from aqueous potassium chloride/potassium bromide solutions, corrosive as well as separation of hazardous gases.

The MCP structures may have an electric field or electromagnetic field across the MCP to create synergestic mass transfer separation potential either to increase or decrease separations. Blood filtering as well as other biomedical separations are possible by this synergestic mass transfer.

Catalytic depositions within the channels of the MCPs, either as wall coatings with the channels open or as solid porous catalytic material that has osmosis action thereacross further enhances chemical reactions during the separation process or during passage through the channels. The procedure can also be used for gas clean-up, such as combustor discharges.

3 Claims, 5 Drawing Figures

4,597,947

MASS TRANSFER AND MATERIAL SEPARATION MICROCHANNEL PLATE APPARATUS

This application is a division of application Ser. No. 509,840 filed June 30, 1983 now abandoned.

The invention described herein may be manufactured, used and licensed by the U.S. Government for governmental purposes without the payment of any royalties thereon.

BACKGROUND OF THE INVENTION

1. Field of the Invention

This invention is relat ed to the use of microchannel plates (MCPs) on plate holders installed in low flow rate distillation/fractionation columns conditioned to prevent weeping of fluids through the channels, to have materials in the channels to enhance chamical reactions, and to apply electric fields across the MCPs to create synergestic mass transfer separation.

2. Description of Prior Art

The MCPs were developed for electron amplification and image intensifier applications. It is not believed that the MCP has ever been used as a sieve to filter or separate materials, such as in fractional distillation columns having cross-flow of liquids across a plurality of plate holders with mixing gases being forced up from the bottom through the channels of the MCPs to separate out elements from the liquids.

SUMMARY OF THE INVENTION

The present invention relates to a mass transfer microchannel plate (MCP) apparatus used in cross-flow systems. The apparatus may be comprised of MCP structures loaded on plate holders in a column type housing wherein the MCP structures are mounted down the column in a downcomer configuration or the MCP structures may be mounted between separately flowing fluids to provide for transfer of elements, compounds, or radicals from one fluid to the other fluid.

The channels of the MCPs may have catalytic depositions therein, either as wall coatings or as solid porous materials wherein osmosis action therethrough enhances chemical reactions during the cross-flow action of gas flowing therethrough. An electric field may conveniently be applied to the electrodes across the channels to create synergestic mass transfer either to retard or enhance transfer between gas and liquids, or maybe between liquid and liquid, liquid and solid, or gas and solids.

The mass transfer MCP apparatus may be used in separation of organic chemicals like petrochemicals, vegetable oils, inorganic chemicals like steam stripping of bromine from aqueous potassium chloride/potassium bromide solutions, chlorine from a gas or liquid, corrosive or hazardous gases, and gas clean up such as combustor discharges.

Blood filtering, as well as other biomedical separations, are possible by applying voltage across the MCP to provide synergestic mass transfer, aligning of platelets, and enhancing separation of elements/radicals.

Other uses for the present invention will become apparent with reference to the detailed description in view of the accompanying drawings.

DETAILED DESCRIPTION OF PREFERRED EMBODIMENTS

Figure 1:
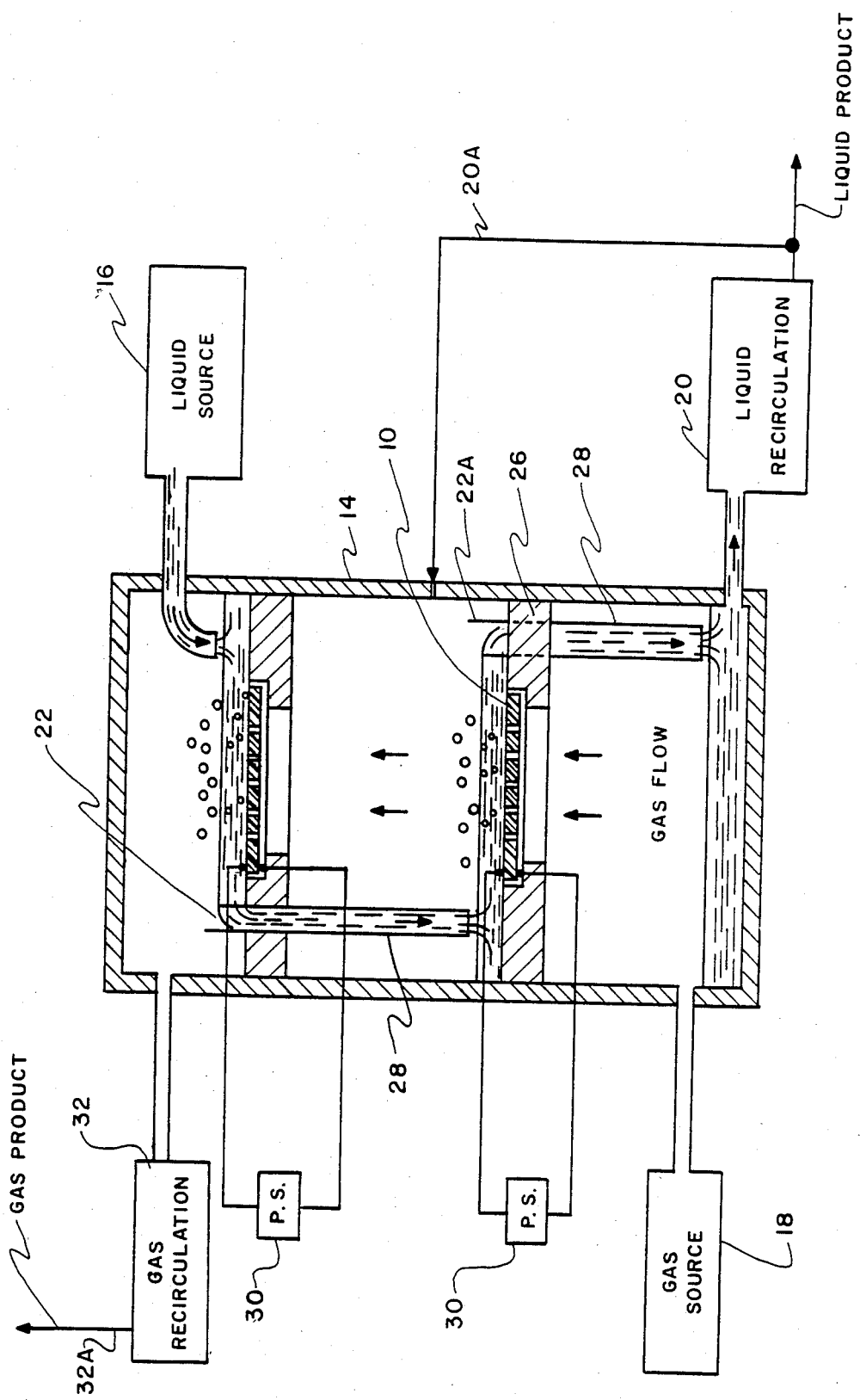
FIG. 1 is a cross-sectional view of the mass transfer microchannel plate apparatus of the present invention.
Figure 4:
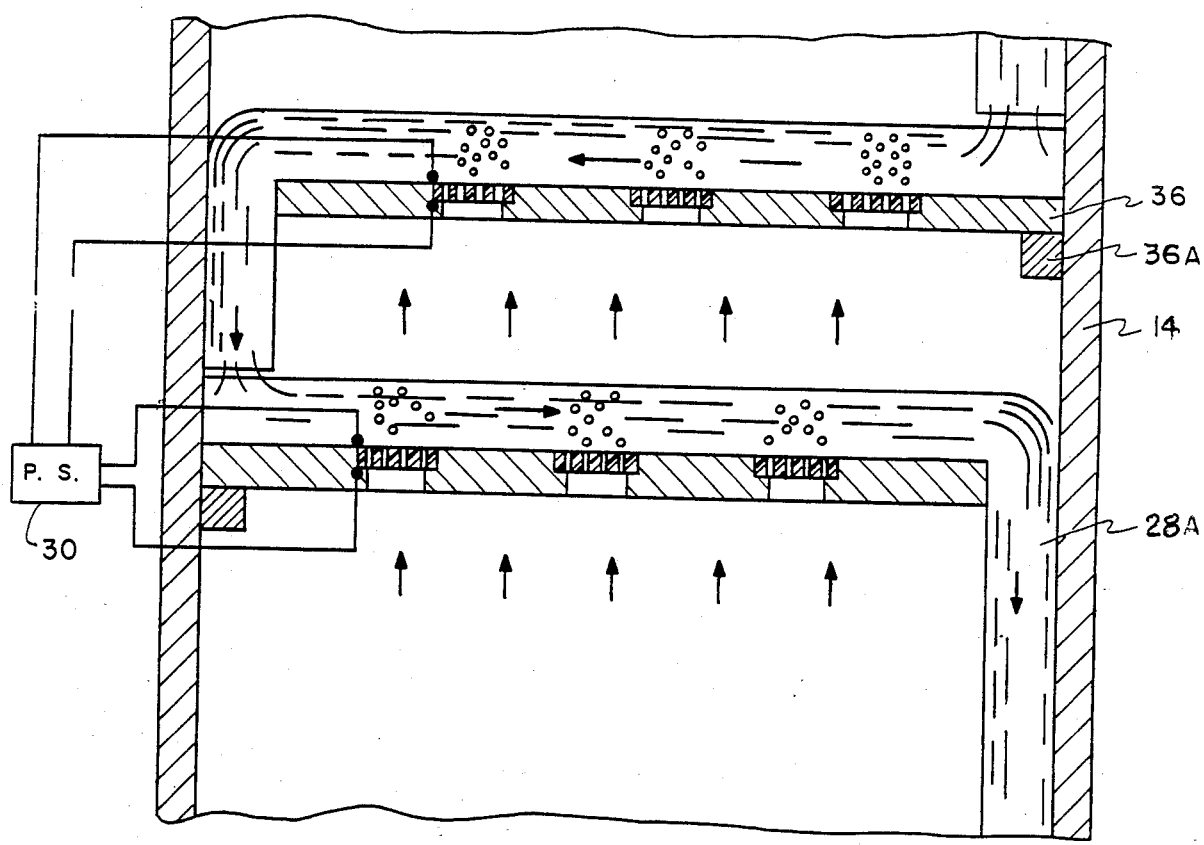
FIG. 4 illustrates a much larger multiple microchannel plate structure apparatus of the present invention.
Figure 5:
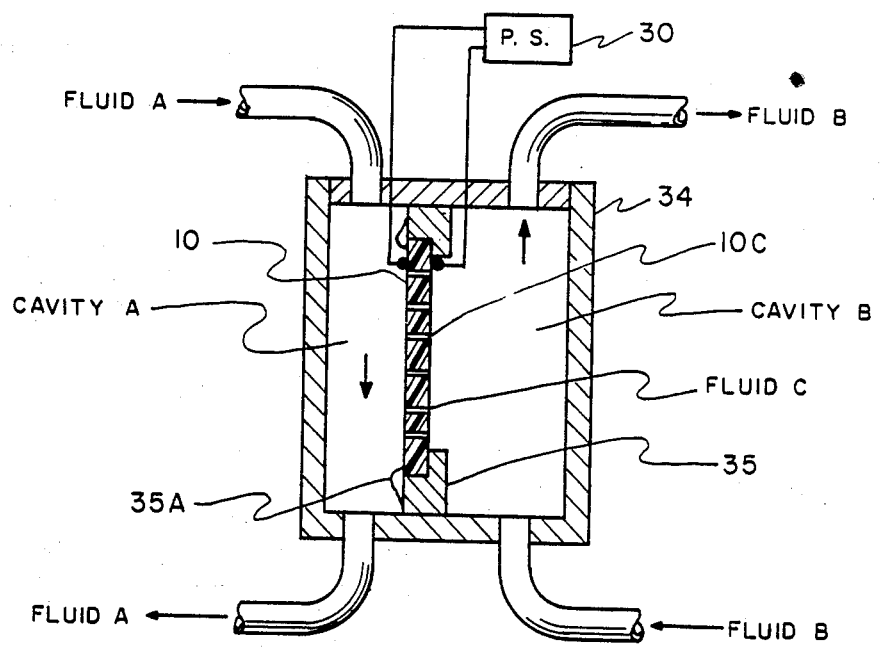
FIG. 5 illustrates a mass transfer microchannel plate apparatus having solid porous catalytic material with osmosis action in the channels as in the present invention.

Refer now to the drawing Figures wherein two types of fluid mass transfer MCP apparatuses for cross-flow systems are shown. One type is the fractional distillation columnar tower type wherein one fluid, which is generally a liquid, is gravity fed from the top of the columnar housing while a second fluid, which is usually a gas, is pressure fed from the lower part of the housing. Two variations of this type are shown in FIGS. 1 and 4. The other type is shown in FIG. 5 and is comprised of an enclosure having two fluid cavities with an MCP apparatus mounted on a plate holder between the cavities. In the columnar type, gases are passed through the channels of the MCPs to mix with the cross-flowing liquid on top of the MCPs. The channel walls are preferably coated with a catalytic material to react with the gases. In the enclosure type with the MCP apparatus between the two fluid cavities, the fluids are appropriate liquids and the channels of the MCPs have solid porous catalytic material therein to react with one of the liquids, or elements of the liquid, which readily migrates therethrough by osmosis action to combine with the other liquid. A power supply in the form of a voltage source may be connected to the electrodes on each side of the MCP to apply on elelctric field across the MCP to create synergestic transfer separation by ionic control.

Figure 2:
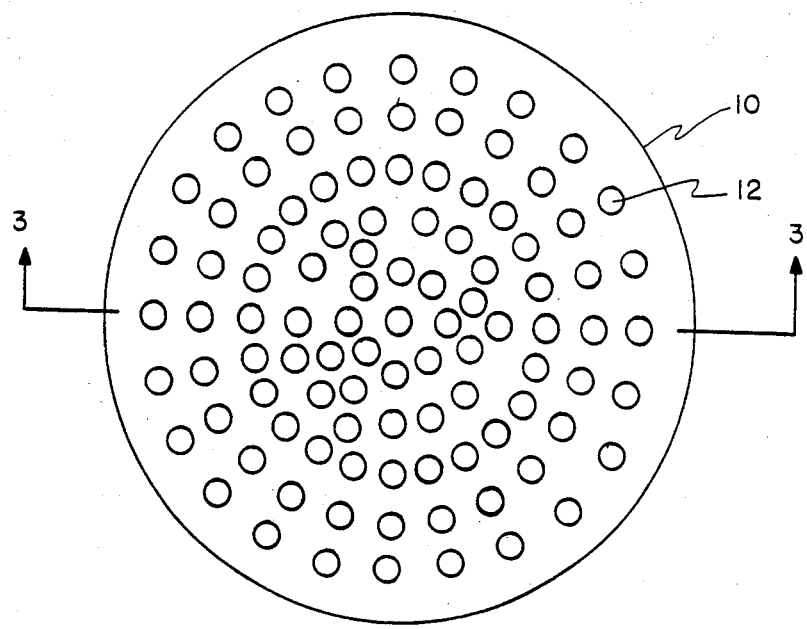
FIG. 2 illustrates a side view of a microchannel plate of FIG. 1.
Figure 3:
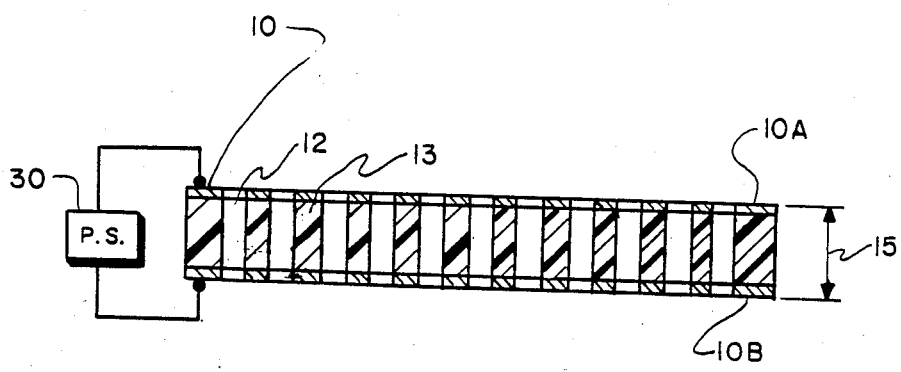
FIG. 3 is a sectional view of 3—3 of FIG. 2.

Refer now to FIGS. 2 and 3 wherein the relative sizes of an MCP are disclosed. The extremely small sizes of the channels, the capability of placing catalytic materials in the channels, and the ability to apply a voltage source across the MCP, which already has the electrodes thereon, to create synergistic mass transfer by ionic control are three advantages of the present invention. Prior fractional distillation columns required a rather high gas flow rate to prevent weeping of the liquid through the sieve plates that were generally used and had much larger perforations, such as about 3/16 inch. By use of the MCPs the flow rate can be greatly reduced and have better mass transfer without added circulation cycles of the fluids. FIG. 2 illustrates a flat view of an MCP 10 with one channel indicated by 12. FIG. 3 is a broken sectional view of FIG. 2 cut through section 3—3. Numerals 10A and 10B represent the two opposite electrodes to which the power supply 30 is connected as shown in the FIG. 3. Numeral 15 represents the distance across the MCP, typically from about 100 to 10,000 microns. The diameter of a channel 12 is generally 4 to 100 microns with a very thin metallic layer along the walls to provide a semiconductive channel wall. The distance 13 between channels is about 2 to 100 microns. The diameter of one MCP, such as represented in FIG. 2, is typically from ¼ inch to 6 inches. None of these stated dimensions are intended to be limited thereto but may vary as appropriate. However, the very small sizes of the MCP channel take advantage of surface tension to prevent weeping. The channels may also be treated to prevent weeping by means, such as polishing, or by chemical etching. The MCPs may be made of glass, ceramic, or metal and may also be retrofitted into existing sieve plate distillation/fractionation mass transfer columns by fitting the MCPs into larger size sieve plate holes.

As shown in FIG. 1, a fluid containment columnar housing 14 has one MCP 10 mounted on each of two plate holders 26 that are generally parallel with each other in a downcomer configuration. Such a column is not intended to be limited to two of the cross-flow plates but may be comprised of as many as is appropriate. Each column would preferably have liquid flowing by gravity at the top from a liquid source 16 onto an MCP 10 mounted on each plate holder 26 wherein the liquid is cross-flowed over the top of the MCP 10 and over a weir 22, with perhaps a back shield 22A to prevent splashing, and down a downspout 28 to the next MCP and plate holder to cross-flow back in the other direction, and so on until the liquid exits the housing 14 in a liquid recirculation chamber 20 for possible recirculation, or stored as the desired fluid product. The fluid may be recirculated back to liquid source 16 or into an intermediate portion of the column 14 by way of some recirculating conduit, represented by numreal 20A. A gas source 18 provides the gas in the lower portion of housing 14 under a pressure that does not effect the liquid flow through the downspouts 28 but with enough pressure to flow through the channels 12 of said plurality of MCPs to react with the catalytic material on the channel walls and disperse with the cross-flowing liquid across the top of each of the plurality of MCPs. The gas mixing with the cross-flowing liquid causes a froth of mixture over each of the MCPs. The gas exits out the top of housing 14 into some reservoir 32, or gas recirculation system as a gas product out a conduit represented by numeral 32A. It should be noted that this configuration may be used for steam scrubbing where steam is substituted as the gas source. In the configuration of FIG. 1 the inside diameter of housing 14 may be from about ¾ inch to 10 inches inside diameter with one MCP 10 per plate holder 26 with the length of each downspout 28 being about 6 inches but not in actual contact with the fluid flowing over the MCP.

FIG. 4 is only a slight variation of the configuration of FIG. 1 and may have the same gas and liquid circulating systems with the downspouts 28A, in the configuration, being along the walls of housing 14. In this configuration, each of a plurality of plate holders 36 has a plurality of MCPs 10 positioned thereon, herein illustrated as three MCPs but preferably many more. Holders 36 may be supported by plate stops 36A attached to housing 14. The inside diameter of housing 14, and thus generally the outside diameter of the plates holders 36 which are attached to the inside walls of housing 14, may be typically from 3 inches to about 10 feet. These dimensions are illustrative and are not intended to be limiting to those ranges.

Plates holders 26 and 36 may be fused by glass beads to housing 14 if the housing is made of glass, or welded or soldered to housing 14 if the housing is made of steel.

FIG. 5 illustrates a fluid containment housing 34 enclosure which has two fluid cavities with one on each side of an MCP 10. A separate fluid is circulated through each separate cavity in fluid contact on each side of the MCP. Only one MCP is illustrated but there may be a plurality of MCPs on a plate holder 35. The MCPs may be secured to plate holder 35 by some hermetic seal means 35 A. Fluid A is shown as flowing through cavity A, and fluid B is shown as flowing through cavity B in a cross-current type flow. Both fluids may flow in the same direction however. The channels 10C of each MCP 10 have solid porous catalytic material therein containing still another fluid, herein called Fluid C, to react with at least one of the fluids. One example of the usefulness of a fluid mass transfer MCP apparatus of the type illustrated by FIG. 5 is where the fluid contained in the porous material within channels 10C is bromo benzene, fluid A is chlorine in some fluid base, and fluid B is calcium carbonate disolved in water. In this example, fluid A, i.e. chlorine in some fluid base, dissolves very fast within the bromo benzene impregnated in the porous material while fluid B, i.e. aqueous calcium carbonate, absorbs the chlorine that moves by osmosis through channels 10C. The calcium carbonate in fluid B reacts with the chlorine to form calcium chloride as thr product whereby chlorine is continuously removed from fluid A. This specific mass separation is very useful in that there are many instances in which chlorine needs to be removed from some fluid base.

I claim:

1. A fluid mass transfer and reaction apparatus comprising:
   a distillation tower having a top portion, a bottom portion, and an inside diameter;
   a plurality of plate holders mounted and vertically spaced within said tower; each plate holder having an associated downcomer;
   at least one mcirochannel plate positioned substantially horizontally on each of said plate holders, each of the microchannel plates having a plurality of vertical channels therethrough, said channels having a diameter within the range of about 4 to about 100 microns, said channels having catalytic material deposited on the walls thereof;
   a first fluid inlet positioned in said top portion of said tower for introducing a liquid reactant stream and a second fluid inlet positioned in said bottom portion of said tower for introducing a gaseous reactant stream; and
   a first fluid outlet positioned in said bottom portion of said tower for dischagre of a liquid stream and a second fluid outlet positioned in said upper portion of said tower for discharge of a gaseous stream wherein said liquid reactant stream introduced into said first inlet flows across the top of each plate holder and its associated at least one microchannel plate and then down the downcomer associated with each plate holder and said gaseous reactant stream introduced into said second inlet flows upwardly through the tower and through the channels of each of said microchannel plates to react with said liquid reactant stream.

2. An apparatus as set forth in claim 1 further comprising means for appyling voltage potential across each of said microchannel plates to electric field across the channels of each of said microchannel plates for effecting synergestic mass transfer separation by ionic control.

3. An apparatus as set forth in claim 2 wherein each of said plurality of plate holders have a plurality of microchannel plates positioned thereon and the inside diameter of said tower is within the range of about 3 inches to about 10 feet.

* * * * *

UNITED STATES PATENT AND TRADEMARK OFFICE
CERTIFICATE OF CORRECTION

PATENT NO. : 4,597,947
DATED : 1 July, 1986
INVENTOR(S) : BIPIN C. ALMAULA

It is certified that error appears in the above—identified patent and that said Letters Patent is hereby corrected as shown below:

Column 4, line 59, after "plates to", insert --thereby produce an--.

Signed and Sealed this

Fourteenth Day of October, 1986

[SEAL]

Attest:

DONALD J. QUIGG

*Attesting Officer*   *Commissioner of Patents and Trademarks*